United States Patent
Carneiro et al.

(10) Patent No.: US 10,048,486 B1
(45) Date of Patent: Aug. 14, 2018

(54) ELECTROWETTING DISPLAY DEVICE INCLUDING A REFLECTIVE LAYER HAVING A SPECULAR REFLECTOR AND A DIFFUSE REFLECTOR

(71) Applicant: Amazon Technologies, Inc., Seattle, WA (US)

(72) Inventors: Steven Ramos Carneiro, Eindhoven (NL); Tulasi Sridhar Reddy Guntaka, Eindhoven (NL); Henricus Petronella Maria Derckx, Weert (NL); Pavel Novoselov, Eindhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 139 days.

(21) Appl. No.: 14/829,087

(22) Filed: Aug. 18, 2015

(51) Int. Cl.
*G02B 26/02* (2006.01)
*G02B 26/00* (2006.01)
*G02B 5/08* (2006.01)
*G02B 5/02* (2006.01)

(52) U.S. Cl.
CPC ......... *G02B 26/005* (2013.01); *G02B 5/0284* (2013.01); *G02B 5/0808* (2013.01); *G02B 2207/115* (2013.01)

(58) Field of Classification Search
CPC .............. G02B 26/005; G02B 26/028; G02B 26/0808; G02B 2207/115
See application file for complete search history.

(56) References Cited

U.S. PATENT DOCUMENTS

| | | | | |
|---|---|---|---|---|
| 8,319,759 | B2 * | 11/2012 | Jacobson | G02B 26/005 345/107 |
| 2008/0278796 | A1 * | 11/2008 | Roosendaal | G02F 1/133553 359/296 |
| 2009/0284824 | A1 * | 11/2009 | Feenstra | G02B 26/004 359/291 |
| 2010/0245408 | A1 * | 9/2010 | Matsuoka | G02B 26/005 345/690 |
| 2013/0342890 | A1 * | 12/2013 | Shim | G09G 3/348 359/290 |
| 2014/0192465 | A1 * | 7/2014 | Giraldo | G02B 26/005 361/679.01 |
| 2014/0218351 | A1 * | 8/2014 | Feenstra | G02B 26/005 345/212 |
| 2014/0285869 | A1 * | 9/2014 | Giraldo | G02B 26/005 359/290 |

* cited by examiner

*Primary Examiner* — Robert E Tallman
(74) *Attorney, Agent, or Firm* — Brinks Gilson & Lione

(57) ABSTRACT

A display device includes a first support plate. A pixel region is formed on the first support plate and a reflective layer is positioned in the pixel region. The reflective layer includes a specular reflector and a diffuse reflector.

18 Claims, 7 Drawing Sheets

ELECTROWETTING DISPLAY DEVICE INCLUDING A REFLECTIVE LAYER HAVING A SPECULAR REFLECTOR AND A DIFFUSE REFLECTOR

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority. Moreover, increased multimedia use imposes high demands on designing, packaging, and fabricating electronic display devices, as content available for mobile use becomes more extensive and device portability continues to be a high priority.

At least some conventional electronic displays include a metal reflector on a bottom plate of the display and an acrylic or polymer-based diffuser layer laminated over or coated on an opposite top plate of the display. As light enters the top plate through the film material the light is diffused and transmitted toward the metal reflector. The diffused light is then reflected by the metal reflector and diffused a second time as the reflected light exits the display through the top plate and the film material. In some instances, the film material has a thickness of about 200 micrometers which adds to an overall thickness of the top plate and may negatively affect a sharpness of the display image. Resolution, optical performance and display quality of an electrowetting electronic display may also depend on other factors, such as an amount of required open area within each pixel, a volume of oil within each pixel, and a cell gap or a distance between the bottom plate and the top plate, for example.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
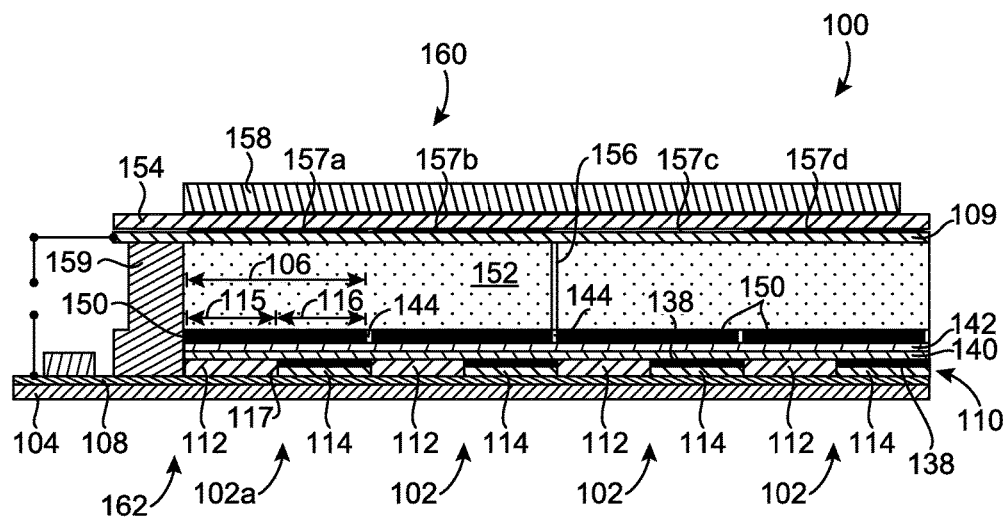
FIG. 1 is a cross-sectional view of the example electrowetting display device of FIG. 3 along sectional line 1-1, according to one embodiment.

In embodiments described herein, an electrowetting pixel region includes a reflective layer combining one or more specular reflectors with one or more diffuse reflectors for a desired combination of specular reflection and diffuse reflection of light within the electrowetting pixel region, to provide a display having an improved paper-like appearance while maintaining a desired brightness level.

In embodiments described herein, an electrowetting display device includes a reflective layer positioned under a pixel grid having a plurality of electrowetting pixels. Each electrowetting pixel is formed by one or more respective pixel walls to define a display surface area of the electrowetting pixel. The electrowetting pixels may have one or more specific and/or additional structural features. The reflective layer includes a specular reflector positioned with respect to, e.g., within or under, at least a first portion of each electrowetting pixel and a diffuse reflector positioned with respect to, e.g., within or under, a second portion of each electrowetting pixel. In certain embodiments, the specular reflector includes a suitable metal, alloy, doped metal, or dielectric reflector material and the diffuse reflector includes a suitable diffuse reflective material, such as titanium dioxide ($TiO_2$), for example.

During operation of the electrowetting display device, light enters the electrowetting display device through a top support plate as a voltage source applies a voltage over the electrode layers, i.e., a first or pixel electrode and a second or top electrode to cause displacement of a fluid, such as a first fluid, contained within one or more electrowetting pixels. The light travels through each electrowetting pixel and, depending on which portion of the reflective layer the light impinges upon, the light is reflected by the reflective layer as specular reflected light or diffuse reflected light which then travels out of the electrowetting display device through the top support plate. As described in greater detail below, a position, a configuration and/or one or more dimensions of each of the specular reflector and the diffuse reflector may be selected to optimize a performance of the electrowetting display device by adjusting the diffuse reflectance to provide a more paper-like appearance while maintaining a desired brightness level provided by the specular reflectance. Moreover, with the disclosed reflective layer, a mechanical strength of the electrowetting pixels may be increased by decreasing a cell gap defined as a distance between a top surface of the pixel wall and a bottom surface of a top support plate, and, in certain embodiments, this distance is substantially equal to a length of a spacer positioned between the pixel wall and the top support plate. In certain embodiments, decreasing the cell gap, may also increase a viewing angle of the display and/or a resolution of the display, while providing the more paper-like appearance. In general, the term "specular reflection" or "specular reflectance" refers to a mirror-like reflection of light from a surface in which light from a single incoming angle or direction (an incident ray) is reflected in a single outgoing angle or direction. In general, the term "diffuse reflection" or "diffuse reflectance" refers to the reflection of light from a surface in which an incident ray is reflected at more than one angle or direction, e.g., many angles or directions, rather than at only one angle or direction as in the case of specular reflection.

To optimize the display performance, therefore, as disclosed in certain embodiments herein, the electrowetting display device includes both a specular reflector and a diffuse reflector positioned with respect to each electrowetting pixel to optimize the specular reflectance and/or the diffuse reflectance within the electrowetting pixel and provide a more paper-like appearance while maintaining a desired brightness level. In some embodiments, both the specular reflector and the diffuse reflector are positioned with respect to the electrowetting pixel at a plane of the reflective layer, enabling an open area, i.e., the area of the pixel that transmits or reflects light when a voltage is applied over the two electrodes, e.g., a transmissive area for a transmissive display or a reflective area for a reflective display, within the electrowetting pixel to be reduced, possibly requiring less oil and decreasing a cell gap. This may make the electrowetting pixel more robust, increase a viewing area of the display, increase a resolution of the display, and/or provide a more paper-like appearance.

In various embodiments described herein, electronic devices include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

An electrowetting pixel is defined by one or more pixel walls that surround or are otherwise associated with at least a portion of the electrowetting pixel. The pixel walls form a structure that is configured to contain at least a portion of a first fluid, such as an opaque oil. Light transmission through the electrowetting pixel is controlled by the application of an electric potential to the electrowetting pixel, which results in a movement of a second fluid, such as an electrolyte solution, into the electrowetting pixel, thereby displacing the first fluid.

When the electrowetting pixel is in an off state (i.e., with no electric potential applied), the first fluid, e.g., the opaque oil, is distributed throughout the electrowetting pixel to substantially cover the display surface area of the electrowetting pixel. The first fluid absorbs light and the electrowetting pixel in this condition appears black in one embodiment. But when the electric potential is applied, the electrowetting pixel is in an on state and the first fluid is displaced to one or more sides of the electrowetting pixel, for example. Light can then enter the electrowetting pixel and impinge upon one or more surfaces of the reflective layer positioned at or near a bottom surface of the electrowetting pixel. The light is then reflected by the reflective layer and reflects out of the electrowetting pixel, causing the electrowetting pixel to appear bright, e.g., white, to an observer. If the one or more reflective surfaces reflect only a portion of the light spectrum or if color filters are incorporated into the electrowetting pixel structure, the electrowetting pixel may appear to have color.

A display device, such as an electrowetting display device, may include a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) included in each pixel. Transistors take up a relatively small fraction of the area of each pixel to allow light to efficiently pass through (or reflect from) the pixel. In certain embodiments, a pixel includes two or more subpixels of an electrowetting display device. Such a pixel or subpixel may be the smallest light transmissive, reflective or transflective pixel of a display that is individually operable to directly control an amount of light transmission through or reflection from the pixel. For example, in some embodiments, a pixel may include a red subpixel, a green subpixel, a blue subpixel, and a white subpixel for RGBW displays. In other embodiments, a pixel may be a smallest component, e.g., the pixel does not include any subpixels.

The array of pixels is sandwiched between two support plates, such as a bottom support plate and an opposing top support plate. For example, a bottom support plate in cooperation with a top support plate may contain pixels that include electrowetting oil, electrolyte solution and pixel walls between the support plates. The support plates may be made of any suitable material including, without limitation, plastic (e.g., a transparent thermoplastic material such as a poly(methyl methacrylate) (PMMA) or other acrylic), glass, quartz, and semiconducting materials, and may be made of a rigid material or a flexible material, for example. Pixels include various layers of materials built upon the bottom support plate. One example layer is an amorphous fluoropolymer (AF1600®) with hydrophobic behavior. The pixel walls may be formed on a top surface of the hydrophobic layer, or, alternatively, may be formed before the hydrophobic layer is deposited, for example. The bottom support plate may be opaque while the top support plate is transparent. Describing a pixel or material as being "transparent" generally means that the pixel or material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is that through which viewing of pixels of a (reflective) electrowetting display occurs.

As described above, individual reflective electrowetting pixels may include an electrode layer containing the drive electronics like TFTs, source lines, and gate lines on the bottom support plate, a reflective layer adjacent to or on the electrode layer, a pixel electrode on the reflective layer, a barrier layer on the reflective layer, and a hydrophobic layer on the barrier layer. The reflector layer itself can act as the pixel electrode or an additional pixel electrode, e.g., an ITO, can be deposited on the reflector layer. The pixel electrode in principle is close to the fluids in the pixel to minimize power consumption. In one embodiment, the pixel electrode is deposited over the reflective layer. In an alternative embodiment, the pixel electrode is under the reflective layer. The electrode layer as shown in FIGS. 1, 2, 4, and 5 can be an electrode layer containing the drive electronics if the reflective layer is used as the electrode or the electrode layer can contain the pixel electrodes in contact with the reflective layer. Pixel walls of each pixel, the hydrophobic layer, and the transparent top support plate at least partially enclose a fluid region within the cavity that includes the first fluid which is electrically non-conductive, e.g., an opaque oil retained in the individual electrowetting pixels by pixel walls, and the second fluid, e.g., an electrolyte solution, that is electrically conductive or polar and may be a water or a salt solution, such as a solution of potassium chloride in water. The second fluid may be transparent, but may be colored, or light-absorbing. The second fluid is immiscible with the first fluid. In general, substances are immiscible with one another if the substances do not substantially form a solution, although in a particular embodiment the second fluid might not be perfectly immiscible with the first fluid. In general, an "opaque" fluid is a fluid that appears black to an observer. For example, an opaque fluid strongly absorbs a broad spectrum of wavelengths (e.g., including those of red, green and blue light) in the visible region of electromagnetic radiation appearing black. However, in certain embodiments an opaque fluid may absorb a relatively narrower spectrum of wavelengths in the visible region of electromagnetic radiation and may not appear perfectly black.

In some embodiments, the opaque fluid is a nonpolar electrowetting oil. In certain embodiments, the first fluid may absorb at least a portion of the visible light spectrum. The first fluid may be transmissive for a portion of the visible light spectrum, forming a color filter. For this purpose, the first fluid may be colored by addition of pigment particles or a dye. Alternatively, the first fluid may be black, for example by absorbing substantially all portions of the visible light spectrum, or reflecting. A reflective first fluid may reflect the entire visible light spectrum, making the layer appear white, or a portion of the entire visible light spectrum, making the layer have a color. In example embodiments, the first fluid is black and, therefore, absorbs substantially all portions of an optical light spectrum, for example, in the visible light spectrum.

Spacers and edge seals mechanically connect the first support plate with the overlying second support plate, or form a separation between the first support plate and the second support plate, to contribute to the mechanical integrity of the electrowetting display device. Edge seals, for example, disposed along a periphery of an array of electrowetting pixels, may contribute to retaining fluids (e.g., the first fluid and the second fluid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based, at least in part, on electronic signals representative of image and/or video data. The code may cause the processor to modulate the optical properties of pixels by controlling electrical signals (e.g., voltages, currents, and fields) on, over, and/or in layers of the electrowetting display device.

Figure 2:
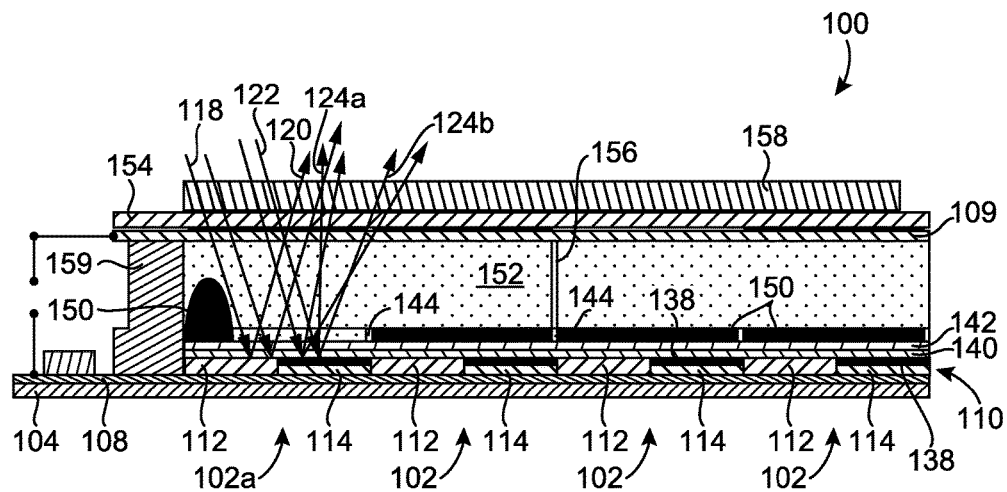
FIG. 2 is a cross-sectional view of the electrowetting display device of FIG. 3 along sectional line 1-1 with a first pixel activated to expose at least a portion of a reflective layer.
Figure 3:
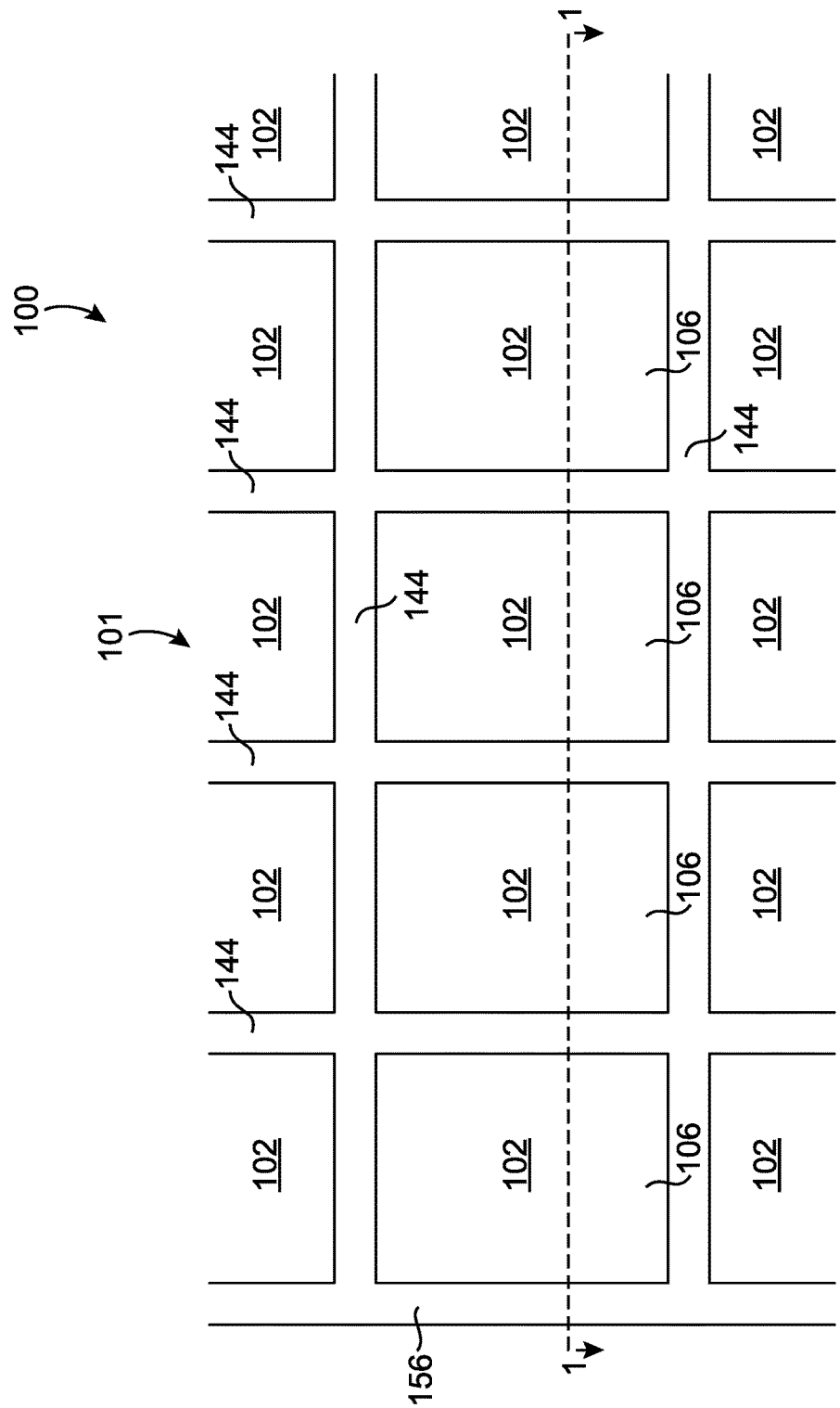
FIG. 3 is a top view of a plurality of electrowetting pixels of an example electrowetting display device.

Referring now to the figures, FIG. 1 is a cross-sectional view of a portion of an example reflective electrowetting display device 100 including a pixel region having a pixel grid 101 with several electrowetting pixels 102 taken along a sectional line 1-1 of FIG. 3. FIG. 2 shows the same cross-sectional view as FIG. 1 in which an electric potential has been applied to one electrowetting pixel 102a causing displacement of a first fluid disposed therein, as described below. Four complete electrowetting pixels 102 are shown in cross-section in FIGS. 1 and 2. FIG. 3 is a top view of example reflective electrowetting display device 100 including pixel grid 101 having a plurality of electrowetting pixels 102 formed over a first or bottom support plate 104 (shown in FIGS. 1 and 2). As shown in FIG. 3, each electrowetting pixel 102 defines a display surface area 106. More specifically, in this embodiment display surface area 106 is defined by pixel walls 144, as described below, having a first dimension, such as a width, between opposing lateral pixel walls 144, and a second dimension, such as a length, between the remaining opposing pixel walls 144. Electrowetting display device 100 may include any number (usually a very large number, such as thousands or millions) of electrowetting pixels 102.

Referring further to FIGS. 1 and 2, an electrode layer 108 having one or more pixel electrodes is formed on bottom support plate 104 and between electrowetting pixels 102 and bottom support plate 104. Electrode layer 108 and/or the one or more pixel electrodes are operatively coupled to a second electrode 109 positioned adjacent, e.g., under, top support plate 154 described below. Alternatively, the second electrode may be along a side of the display in contact with the second fluid. These example embodiments are not limiting with respect to the location of the first and second electrode, and claimed subject matter is not limited in this respect. In particular embodiments, one or more additional layers may be positioned between electrode layer 108 and bottom support plate 104, in which TFTs, gates, and/or source lines are located, for example. In these embodiments, electrode layer 108 may not be formed directly on bottom support plate 104. In various embodiments, electrode layer 108 may be connected to any number of transistors, such as suitable thin film transistors (TFTs) (not shown), that are switched to either select or deselect corresponding electrowetting pixels 102 using active matrix addressing, for example. A TFT is a particular type of field-effect transistor that includes thin films of an active semiconductor layer as well as a dielectric layer and metallic contacts over a supporting (but nonconducting) substrate, which may be glass or any suitable transparent or non-transparent material, for example.

A reflective layer 110 is positioned adjacent, e.g., on electrode layer 108, as shown in FIGS. 1 and 2, for example. In particular embodiments, one or more additional layers may be positioned between reflective layer 110 and electrode layer 108. In these embodiments, reflective layer 110 may not be formed directly on electrode layer 108. In an alternative embodiment, reflective layer 110 is positioned under a transparent electrode layer. In this alternative embodiment, reflective layer 110 is positioned between the transparent electrode layer and bottom support plate 104. Reflective layer 110 may reflect light within the entire visible spectrum, making the layer appear relatively bright, or reflect a portion of light within the visible spectrum, making the layer have a color. In this embodiment, reflective layer 110 includes a specular reflector 112 and a diffuse reflector 114 positioned within the pixel region, e.g., within each electrowetting pixel 102. This configuration may be referred to as a planar diffuse reflector configuration, i.e., a top surface of diffuse reflector 114 opposite a bottom surface adjacent or near electrode layer 108 is coplanar with a top surface of specular reflector 112 opposite a bottom surface adjacent or near electrode layer 108.

As shown in FIGS. 1 and 2, specular reflector 112 is positioned on electrode layer 108 with respect to, e.g., within or under, at least a first portion 115 of display surface area 106 of electrowetting pixel 102 and diffuse reflector 114 is positioned on electrode layer 108 with respect to, e.g., within or under, a second portion 116 of display area 106 different from first portion 115. In certain embodiment, first portion 115 and second portion 116 at least partially form or define display surface area 106. While a boundary 117 (as shown in FIG. 1, for example) between specular reflector 112 and diffuse reflector 114 is linear in the embodiment shown in FIGS. 1 and 2, in alternative embodiments boundary 117 may be non-linear having any suitable profile. As such, boundary 117 is not limited to the location as shown in the figures.

In certain embodiments, specular reflector 112 is formed or made of any suitable materials including, for example, a metal (90%, 95% or greater than 95% metal), an alloy, a doped metal, or a dielectric reflector material. Suitable metal materials for specular reflector 112 include, without limitation, aluminum, silver, gold, copper, nickel, platinum, rhodium, lanthanum, and/or silicon nickel. Suitable alloy materials for specular reflector 112 include, without limitation, aluminum with copper or aluminum with nickel. In alternative embodiments, specular reflector 112 is made of any suitable material providing a desired specular reflectance. In certain embodiments, diffuse reflector 114 is made of a suitable diffuse reflective material deposited on or over electrode layer 108 and/or on or over specular reflector 112. Although diffuse reflector 114 may include any suitable diffuse reflective material providing a desired diffuse reflectance, in a particular embodiment, the diffuse reflective material of diffuse reflector 114 is titanium dioxide ($TiO_2$).

Referring further to FIG. 2, with an electric potential applied to electrowetting pixel 102a causing displacement of a first fluid disposed within electrowetting pixel 102a, light entering electrowetting display device 100 travels through electrowetting pixel 102a and impinges upon specular reflector 112 and/or diffuse reflector 114. For example, an incident light ray, such as light ray 118, impinging upon specular reflector 112 at a single incoming angle or direction is reflected by a surface of specular reflector 112 in a single mirror-like outgoing angle or direction as light ray 120, while an incident light ray, such as light ray 122, impinging upon a surface of diffuse reflector 114 at a single incoming angle or direction is reflected by diffuse reflector 114 in a plurality of outgoing angles or directions as a plurality of light rays, such as light ray 124a and light ray 124b for example.

In certain embodiments, a degree of diffusion or a diffuse reflectance can be characterized by diffusivity. Diffusivity is defined as a ratio between diffuse reflectance (SCE) to that of specular reflectance (SCI), as set forth below:

$$\text{Diffusivity} = \frac{SCE}{SCI},$$

where SCI is "Specular Component Included" and SCE is "Specular Component Excluded." Both SCI and SCE are measured with a suitable device, such as a Konica Minolta spectrophotometer CM-2600D.

For example, in a display that does not include a diffuser, a diffusivity may be as low as a few percent (as low as 5%). This low percent diffusivity may be due to inherent scattering that occurs at different layers of the display device. The same diffusivity can be increased to about 63% with a limited viewing angle using a conventional diffuser layer laminated over an outer surface of the display. The diffusivity may be enhanced to 90% or greater with other special diffusers having a completely different viewing angle experience. A lambertian diffuser may have a diffusivity of 99% or greater, approaching 100%. The example embodiments described herein produce a display with a diffusivity of at least 60%, and, more specifically, between 60% and 90%. In certain embodiments, the diffusivity of the example embodiments is greater than 90%.

Electrowetting pixels 102 may have specific and/or additional structural features. Additionally or alternatively, reflective layer 110 may have structural features, for example one or more relatively thinner areas and/or one or more relatively thicker areas within reflective layer 110 to control movement of the fluids. Alternatively, reflective layer 110 may be deposited on a structural feature conforming to a shape of the structural feature.

Figure 4:
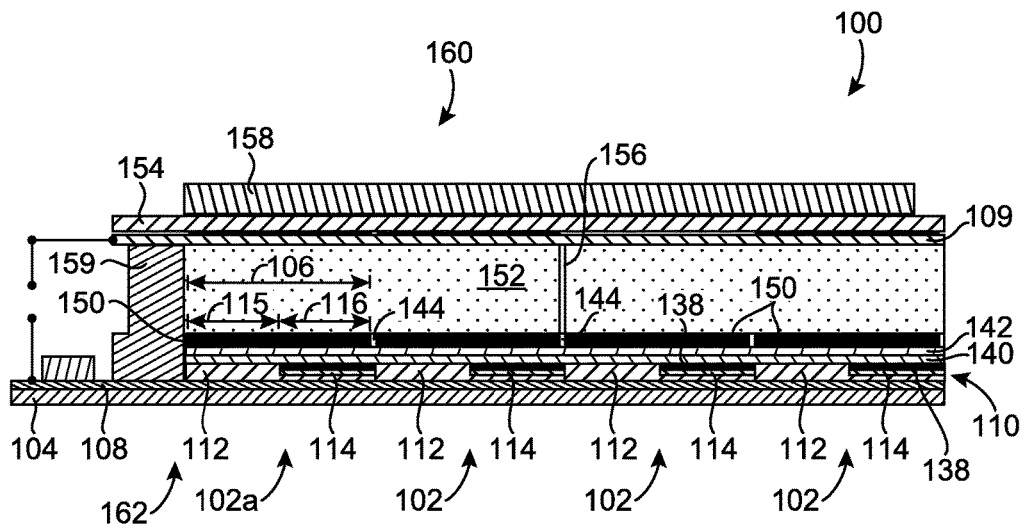
FIG. 4 is a cross-sectional view of an alternative example electrowetting display device, according to one embodiment.
Figure 5:
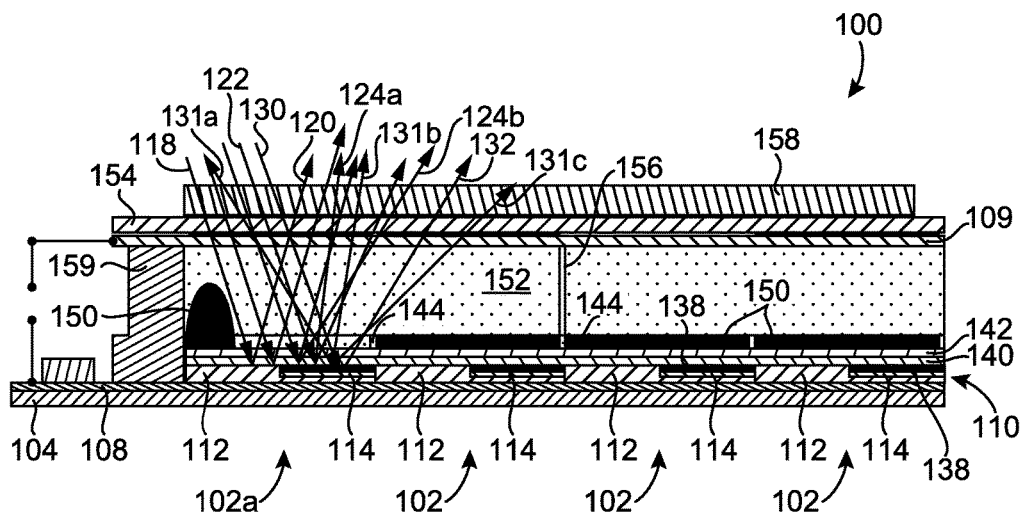
FIG. 5 is a cross-sectional view of the electrowetting display device of FIG. 4 with a first pixel activated to expose at least a portion of a reflective layer.

In an alternative example embodiment as shown in FIGS. 4 and 5, reflective layer 110 includes specular reflector 112 positioned on electrode layer 108 with respect to, e.g., under, at least first portion 115 of display surface area 106 of electrowetting pixel 102 and diffuse reflector 114 positioned with respect to, e.g., under, second portion 116 of display surface area 106 different from first portion 115. However, in this embodiment, specular reflector 112 extends at least partially into second portion 116 of display surface area 106 between diffuse reflector 114 and electrode layer 108 such that specular reflector 112 contacts at least a portion of a bottom surface of diffuse reflector 114. In particular embodiments, one or more additional layers may be positioned between reflective layer 110 and electrode layer 108. In these embodiments, reflective layer 110 may not be formed directly on electrode layer 108. In this embodiment as shown in FIGS. 4 and 5, specular reflector 112 extends along the entire dimension of diffuse reflector 114 between diffuse reflector 114 and electrode layer 108. This configuration may be referred to as an elevated diffuse reflector configuration, i.e., a bottom surface of diffuse reflector 114 adjacent electrode layer 108 is not coplanar with a bottom surface of specular reflector 112 adjacent electrode layer 108 but, rather, specular reflector 112 is positioned under diffuse reflector 114 between diffuse reflector 114 and electrode layer 108.

Referring further to FIG. 5, with an electric potential applied to electrowetting pixel 102a causing displacement of a first fluid disposed within electrowetting pixel 102a, incident light ray 118, for example, impinging upon specular reflector 112 at a single incoming angle or direction is reflected by a surface of specular reflector 112 in a single mirror-like outgoing angle or direction as light ray 120, while incident light ray 122, for example, impinging upon a surface of diffuse reflector 114 at a single incoming angle or direction is potentially reflected by diffuse reflector 114 in a plurality of outgoing angles or directions as light ray 124a and light ray 124b, for example. In this embodiment, an incident light ray, such as light ray 130, may be partially diffused at a surface of diffuse reflector 114 in a plurality of outgoing angles or directions as light ray 131a, light ray 131b, and light ray 131c, for example. Light ray 130 may continue to travel through diffuse reflector 114 and impinge upon specular reflector 112 positioned with respect to second portion 116 of display surface area 106 at a single incoming angle or direction and be reflected by a surface of specular reflector 112 in a single mirror-like outgoing angle or direction as light ray 132.

Similar to the embodiment shown in FIGS. 1-3, in the embodiment shown in FIGS. 4 and 5, electrowetting pixels 102 may have specific and/or additional structural features. Additionally or alternatively, reflective layer 110 may have structural features, for example one or more relatively thinner areas and/or one or more relatively thicker areas within reflective layer 110 to control movement of the fluids. Alternatively, reflective layer 110 may be deposited on a structural feature conforming to a shape of the structural feature.

Referring again to FIGS. 1 and 2, for example, in a particular embodiment, a planarization layer 138 is patterned on each diffuse reflector 114 to enhance the electrowetting properties of electrowetting pixel 102. In one embodiment, planarization layer 138 is transparent. More specifically, planarization layer 138 enhances oil movement without negatively affecting optical performance of electrowetting pixel 102. In one embodiment, planarization layer 138 is formed on diffuse reflector 114. Planarization layer 138 may be formed to wholly cover each diffuse reflector 138. For example, planarization layer 138 may be formed by using a negative type photoresist compound. Planarization layer 138 may be formed by a spin coating method and/or a slit coating method. A method of forming planarization layer 138 is not limited to the coating method. Planarization layer 160 may be formed by using an ink jet printing process, a screen or silk printing process, a one drop filling (ODF) process, a transfer process, or a rolling process, for example. A desired thickness of planarization layer 138 may be removed through an ashing process to form a mask pattern in certain embodiments.

In an alternative embodiment, planarization layer 138 is formed using a positive type photoresist compound. When a light reaction compound configuring planarization layer 138 is light reacted, light is provided to planarization layer 138, and a partial exposure process of planarization layer 138 may be performed. That is, when planarization layer 138 includes the positive type photoresist compound, a specific thickness of planarization layer 138 is light reacted by the partial exposure process to remove the specific thickness of planarization layer 138.

A suitable dielectric barrier layer 140 may at least partially separate electrode layer 108 from a hydrophobic layer 142, such as an amorphous fluoropolymer layer for example, forming a bottom surface of electrowetting pixel 102. For example, barrier layer 140 in certain embodiments is deposited on the patterned planarization layer 138 and specular reflector 112 not covered by planarization layer 138. Dielectric barrier layer 140 may be formed from various materials including organic/inorganic multilayer stacks or silicon dioxide ($SiO_2$) and polyimide layers. A thickness of the insulating layer may be less than 2 micrometers and may be less than 1 micrometer; for example, the insulating layer may be 400 nanometers or less in thickness. In some embodiments, hydrophobic layer 142 is an amorphous fluoropolymer layer including any suitable fluoropolymer(s), such as AF1600®, produced by DuPont, based in Wilmington, Del. Hydrophobic layer 142 may be transparent or colored.

A plurality of pixel walls 144 form patterned electrowetting pixel grid 101 on hydrophobic layer 142. Pixel walls 144 may include a photoresist material such as, for example, epoxy-based negative photoresist SU-8. Patterned electrowetting pixel grid 101 includes a plurality of rows and a plurality of columns that form an array of electrowetting pixels, such as shown in FIG. 3, including a plurality of electrowetting pixels 102 that may have a width and a length in a range of about 50 to 500 micrometers, for example.

A first fluid 150, which may have a thickness (e.g., a height as shown in FIGS. 1 and 2 for example) in a range of about 1 to 10 micrometers, for example, overlays hydrophobic layer 142. First fluid 150 is partitioned by pixel walls 144 of patterned electrowetting pixel grid 101. A second fluid 152, such as an electrolyte solution, overlays first fluid 150 and pixel walls 144 of patterned electrowetting pixel grid 101. In certain embodiments, as described above, second fluid 152 may be electrically conductive and/or polar. For example, second fluid 152 may be water or a water solution, or a salt solution such as a solution of potassium chloride in water or a mixture of water and ethyl alcohol. In certain embodiments, second fluid 152 is transparent, but may be colored or absorbing. First fluid 150 is electrically non-conductive and may for example be an alkane like hexadecane or (silicone) oil. First fluid 150 is immiscible with second fluid 152.

A second or top support plate 154 covers second fluid 152 and one or more spacers 156 to maintain second fluid 152 over electrowetting pixel grid 101. In one embodiment, spacer 156 extends from top support plate 154 and may rest upon a top surface of one or more pixel walls 144. In alternative embodiments, spacer 156 does not rest on pixel wall 144 but is substantially aligned with pixel wall 144. This arrangement may allow spacer 156 to come into contact with pixel wall 144 upon a sufficient pressure or force being applied to top support plate 154. Multiple spacers 156 may be interspersed throughout electrowetting pixel grid 101. In certain embodiments, one or more filter, such as color filters 157a-d shown in FIG. 1, may be positioned between second electrode 109 and top support plate 154. A diffuser layer 158 may be applied to an outer surface of at least a portion of top support plate 154 to provide additional diffusion of light entering and exiting electrowetting display device 100 as desired. As shown in FIGS. 1, 2, 4, and 5, a seal 159 extends about a perimeter of electrowetting display device 100 to contain first fluid 150 and second fluid 152 within the fluid region of the cavity.

A voltage applied across, among other things, second fluid 152 and electrode layer 108 of individual electrowetting pixels 102 may control transmittance or reflectance of the individual electrowetting pixels 102.

Reflective electrowetting display device 100 has a viewing side 160 corresponding to top support plate 154 through which an image formed by reflective electrowetting display device 100 may be viewed, and an opposing rear side 162 corresponding to bottom support plate 104 as shown, for example, in FIGS. 1 and 4. Reflective electrowetting display device 100 may be a segmented display type in which the image is built of segments. The segments may be switched simultaneously or separately. Each segment includes one electrowetting pixel 102 or a number of electrowetting pixels 102 that may be neighboring or distant from one another. Electrowetting pixels 102 included in one segment are switched simultaneously, for example. Electrowetting display device 100 may also be an active matrix driven display type or a passive matrix driven display, for example.

As described above, hydrophobic layer 142 is arranged on bottom support plate 104 to create an electrowetting surface area. The hydrophobic character of hydrophobic layer 142 causes first fluid 150 to adhere preferentially to hydrophobic layer 142 because first fluid 150 has a higher wettability with respect to a top surface of hydrophobic layer 142 than second fluid 152 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

Figure 6:
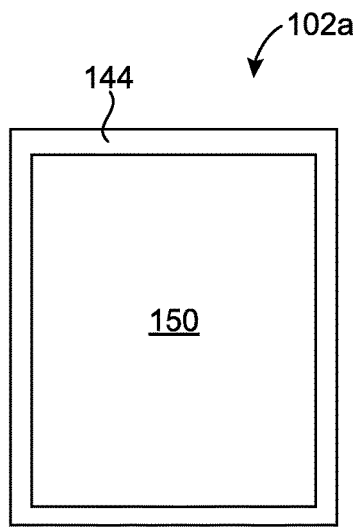
FIG. 6 a top view of an electrowetting pixel with a first fluid distributed throughout the electrowetting pixel.
Figure 7A:
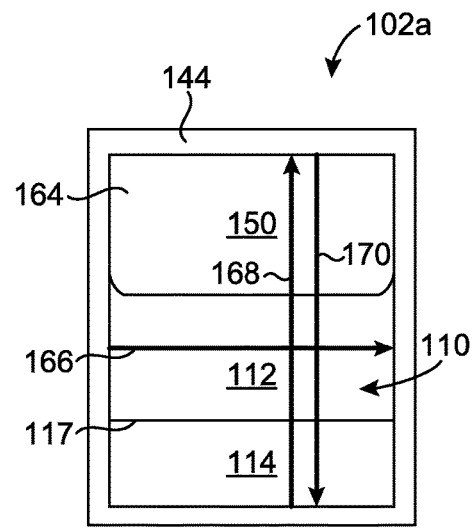
FIG. 7A is a top view of the electrowetting pixel of FIG. 6 activated to expose at least a portion of a reflective layer positioned under the electrowetting pixel, according to one embodiment.
Figure 7B:
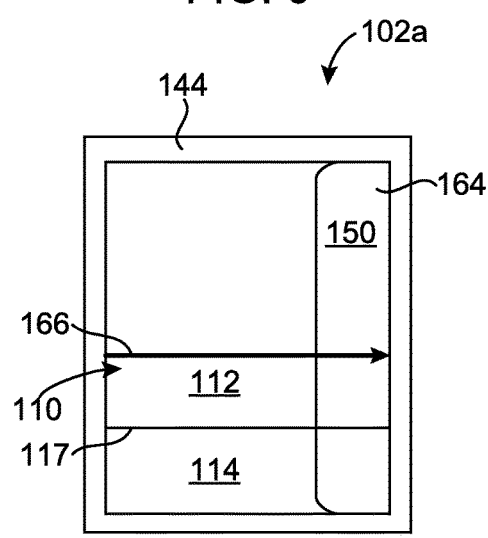
FIG. 7B is a top view of an alternative example electrowetting pixel activated to expose at least a portion of a reflective layer positioned under the electrowetting pixel, according to one embodiment.
Figure 8:
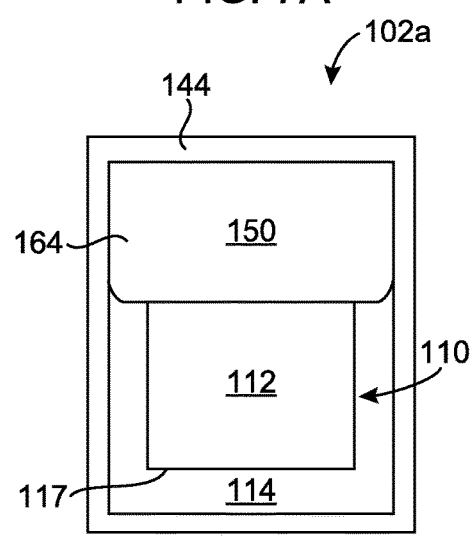
FIG. 8 is a top view of an alternative example electrowetting pixel activated to expose at least a portion of a reflective layer positioned under the electrowetting pixel, according to one embodiment.

FIG. 6 is a top view of electrowetting pixel 102a in an inactive or off state with first fluid 150 distributed throughout electrowetting pixel 102a to cover hydrophobic layer 142 and prevent or limit light from impinging upon reflective layer 110. If a voltage is applied across electrowetting pixel 102a, electrowetting pixel 102a will enter into an active or on state, such as shown in FIGS. 7A, 7B, and 8 with at least a portion of reflective layer 110 exposed by second fluid 152. Electrostatic forces will move second fluid 152 (not shown in FIGS. 7A, 7B, and 8) toward electrode layer 108 within active electrowetting pixel 102a as hydrophobic layer 142 formed within active electrowetting pixel 102a becomes hydrophilic, thereby displacing first fluid 150 from an area of hydrophobic layer 142 to pixel walls 144 surrounding hydrophobic layer 142, such that first fluid 150 contracts to form a droplet 164, as shown in FIG. 7A for example. In this embodiment, when a voltage is applied within electrowetting pixel 102a, first fluid 150 moves (in direction 168 shown in FIG. 7A) from second portion 116 of display surface area 106 to first portion 115 of display surface area 106 to at least partially expose display surface area 106. Such displacing action uncovers first fluid 150 from the surface of hydrophobic layer 142 of electrowetting pixel 102a to expose at least a portion of diffuse reflector 114. As first fluid 150 moves into first portion 115, at least a portion of specular reflector 112 may also be exposed.

In an alternative embodiment, first fluid 150 moves from first portion 115 of display surface area 106 to second portion 116 of display surface area 106 to at least partially expose display surface area 106 when a voltage is applied within electrowetting pixel 102a. In this example, first fluid 150 moves from first portion 115 to second portion 116 to expose at least a portion of specular reflector 112. As first fluid 150 moves into second portion 116, at least a portion of diffuse reflector 114 may also be exposed.

In another alternative embodiment, the first fluid motion might be perpendicular to boundary 117 between specular reflector 112 and diffuse reflector 114. For example, first portion 115 and second portion 116 may extend in a first direction across electrowetting pixel 102a and, with the voltage applied within electrowetting pixel 102, first fluid 150 moves in a second direction perpendicular to the first direction to at least partially expose the display surface area 106. As first fluid 150 is displaced, at least a portion of specular reflector 112 and at least a portion of diffuse reflector 114 are exposed. Moreover, a ratio between specular reflector 112 and diffuse reflector 114 may be variable over the display (i.e., between electrowetting pixels 102), e.g., this ratio may vary based on a position of electrowetting pixel 102a with respect to a color filter element or with respect to a position of electrowetting pixel 102a with respect to a lightguide.

In certain embodiments, as the driving voltage applied to electrowetting pixel 102a is increased, first fluid 150 is formed into a smaller droplet exposing a relatively larger portion of specular reflector 112 and/or diffuse reflector 114. A ratio of an exposed surface area of specular reflector 112 to an exposed surface area of diffuse reflector 114 will control a ratio of specular reflected light to diffused reflected light changing an appearance of electrowetting pixel 102a. Light entering through top support plate 154 travels through electrowetting pixel 102a and is reflected by specular reflector 112 and/or diffuse reflector 114.

FIG. 8 is a top view of electrowetting pixel 102a in an active state with at least a portion of reflective layer 110 exposed by electrowetting fluid 152. As shown in FIG. 8, in this embodiment specular reflector 112 is positioned within a first portion of an electrowetting pixel region, e.g., a central region of electrowetting pixel 102a, and diffuse reflector 114 is positioned within a second portion of the electrowetting pixel region, e.g., diffuse reflector 114 extends around at least a portion of a perimeter of specular reflector 112. In certain embodiments, at least a portion of the perimeter of specular reflector 112, for example, a portion of the perimeter nearest pixel wall 144 opposite the first fluid droplet with electrowetting pixel in an active state, may have any suitable profile, such as a waveform, serpentine, or non-linear profile, at an edge of specular reflector 112.

With an electric potential applied to electrode layer 108 in activated electrowetting pixel 102a, second fluid 152 is attracted towards electrode layer 108 displacing first fluid 150 towards pixel wall 144 within activated electrowetting pixel 102a. In the example of FIGS. 7A and 8, first fluid 150 of electrowetting pixel 102a has contracted to form a droplet 164 of first fluid 150 as a result of an electric potential being applied to electrowetting pixel 102a. With electrowetting pixel 102a in the active state, in certain embodiments at least a portion of specular reflector 112 and at least a portion of diffuse reflector 114 are exposed and light entering through top support plate 154 travels through electrowetting pixel 102a and is reflected by specular reflector 112 and/or diffuse reflector 114. The reflected light then travels through top support plate 154 increasing the perceived brightness of electrowetting pixel 102a, thereby increasing an overall image quality of electrowetting display device 100. In the embodiment shown in FIG. 8, specular light reflected by specular reflector 112 may interact with diffuse light reflected by diffuse reflector 114 surrounding specular reflector 112 to minimize the affect of the directional specular reflection, for example, and provide an enhanced paper-like appearance.

Referring further to FIG. 7A, for example, in certain embodiments first portion 115 including specular reflector 112 extends in a first direction 166 across a surface of electrowetting pixel 102a. In the example shown in FIG. 7A, first direction 166 extends between the lateral edges of electrowetting pixel 102a parallel to a bottom edge of electrowetting pixel 102a. Second portion 116 including diffuse reflector 114 extends parallel to first portion 115 in first direction 166. As such, boundary 117 between specular reflector 112 and diffuse reflector 114 extends parallel to the pixel wall at the bottom edge of electrowetting pixel 102a. One or more pixel electrodes are associated with electrowetting pixel 102a for applying a voltage within electrowetting pixel 102a to cause displacement of the first fluid to at least partially expose at least one of specular reflector 112 and diffuse reflector 114. For example, with a voltage applied within electrowetting pixel 102a, first fluid 150 moves in a second direction 168 across the surface of electrowetting pixel 102a perpendicular to first direction 166 to at least partially expose diffuse reflector 114 within second portion 116. In the example shown in FIG. 7A, first fluid 150 moves in second direction 168 from the bottom edge of electrowetting pixel 102a toward a top edge of electrowetting pixel 102a to form droplet 164. In a particular embodiment, first fluid 150 continues to move toward the top edge of electrowetting pixel 102a, exposing all of diffuse reflector 114 and at least a portion of specular reflector 112 within first portion 115. In an alternative embodiment, with a voltage applied within electrowetting pixel 102a, first fluid 150 moves in a third direction 170 across the surface of electrowetting pixel 102a opposite second direction 168 and perpendicular to first direction 166 to at least partially expose specular reflector 112 within first portion 115. In this embodiment, as first fluid 150 continues to move in third direction 170, all of specular reflector 112 is exposed and at least a portion of diffuse reflector 114 within second portion 116 is exposed.

In a further embodiment with first portion 115 and second portion 116 extending parallel to each other in first direction 166, boundary 117 between specular reflector 112 and diffuse reflector 114 extends parallel to the pixel wall at the bottom edge of electrowetting pixel 102a. One or more pixel electrodes are associated with electrowetting pixel 102a for applying a voltage within electrowetting pixel 102a to cause displacement of the first fluid to at least partially expose specular reflector 112 and diffuse reflector 114. For example, with a voltage applied within electrowetting pixel 102a, first fluid 150 moves in first direction 166, i.e., from one lateral edge toward the opposing lateral edge of electrowetting pixel 102a. As first fluid 150 moves in first direction 166, specular reflector 112 within first portion 115 and diffuse reflector 114 within second portion 116 are exposed substantially simultaneously. As first fluid 150 continues to move across the surface of electrowetting pixel 02a, specular reflector 112 and diffuse reflector 114 are exposed and light entering electrowetting pixel 102a may be reflected by specular reflector 112 within first portion 115 and/or diffuse reflector 114 within second portion 116. In alternative embodiments, first fluid 150 may move in any desired direction, not necessarily only in first direction 166, second direction 168, and/or third direction 170. Moreover, in certain embodiments, specular reflector 112 may be positioned within second portion 116 and diffuse reflector 114 may be positioned within first portion 115. These example embodiments as shown in FIGS. 7A, 7B, and 8 are not limiting with respect to locations of specular reflector 112 and diffuse reflector 114 and/or a ratio of specular reflector 112 to diffuse reflector 114 within reflective layer 110, and claimed subject matter is not limited in this respect. For example, in one embodiment, a first pixel electrode is associated with a first portion of an electrowetting region, e.g., an electrowetting pixel, for applying a voltage within the pixel region, e.g., the electrowetting pixel, to cause displacement of the first fluid in a first direction and a second pixel electrode is associated with a second portion of the electrowetting region, e.g., the electrowetting pixel, for applying a voltage within the electrowetting region, e.g., the electrowetting pixel, to cause displacement of the first fluid in a second direction different from the first direction.

After activation shown in FIGS. 7A and 8 for example, when the voltage across electrowetting pixel 102a is returned to an inactive signal level of zero or a value near to zero, electrowetting pixel 102a will return to an inactive state, as shown in FIG. 6, such that first fluid 150 is distributed throughout electrowetting pixel 102a. In this way, first fluid 150 forms an electrically controllable optical switch in each electrowetting pixel 102.

Desired optical performance, such as an optimization of brightness and diffusion characteristics of electrowetting display device 100, can be achieved through reflective layer design. Adjusting a number and/or a configuration of specular reflectors 112 and/or diffuse reflectors 114 within reflective layer 110, for example, as well as adjusting a volume of first fluid 150 within a respective pixel 102, can achieve such desired optical performance. Diffuse reflectance in a display can significantly enhance the viewing angle performance, i.e., increase an angle measured from an axis normal to the top support plate at which a user is able to view the content displayed, under various illumination or lighting conditions.

In one embodiment, an electrowetting display device includes a first support plate and a second support plate. An electrowetting pixel region is positioned between the first support plate and the second support plate and a reflective layer is positioned within the electrowetting pixel region. The reflective layer includes a specular reflector and a diffuse reflector. An first fluid, e.g., an oil, and a second fluid, e.g., an electrolyte solution, that is immiscible with the first fluid are arranged in the electrowetting pixel region. A pixel electrode is associated with the electrowetting pixel region. The pixel electrode for applying a voltage within the electrowetting pixel region to cause relative displacement of the first fluid and the second fluid to expose at least a portion of at least one of the specular reflector and the diffuse reflector. In one embodiment, the pixel electrode is positioned within an electrode layer positioned between the reflective layer and the first support plate, and the reflective layer contacts the pixel electrode. In an alternative embodiment, the pixel electrode is positioned within a transparent electrode layer and the reflective layer is positioned between the transparent electrode layer and the first support plate. The electrowetting pixel region may include an electrowetting pixel with the specular reflector positioned within a first portion of the electrowetting pixel and the diffuse reflector positioned within a second portion of the electrowetting pixel different from the first portion.

In one embodiment, the display device includes a first support plate. A pixel region is formed on the first support plate and a reflective layer is positioned in the pixel region. The reflective layer includes a specular reflector and a diffuse reflector. A second support plate is coupled to the first support plate. A first fluid and a second fluid that is immiscible with the first fluid are arranged in the pixel region. A pixel electrode is associated with the pixel region for applying a voltage within the pixel region to cause relative displacement of the first fluid and the second fluid. With the pixel region in an on state, the first fluid forms a droplet within the pixel region to at least partially expose the reflective layer. In a particular embodiment, the pixel region includes a pixel. The specular reflector is positioned within a first portion of the pixel and the diffuse reflector is positioned within a second portion of the pixel different from the first portion. In a particular embodiment, the pixel includes a pixel wall and a boundary between the specular reflector and the diffuse reflector extends parallel with the pixel wall in a first direction across the pixel. The display device includes a pixel electrode associated with the pixel for applying a voltage within the pixel to cause displacement of the first fluid in a second direction perpendicular to the first direction to at least partially expose one of the specular reflector and the diffuse reflector. The display device may also include a pixel electrode associated with the pixel for applying a voltage within the pixel to cause displacement of the first fluid in the first direction to at least partially expose the specular reflector and the diffuse reflector substantially simultaneously. For example, a first pixel electrode may be associated with a first portion of the pixel for applying a voltage within the pixel to cause displacement of the first fluid in a first direction and a second pixel electrode may be associated with a second portion of the pixel for applying a voltage within the pixel to cause displacement of the first fluid in a second direction different from the first direction. In certain embodiments, the reflective layer has a diffusivity of at least 60%.

Figure 9:
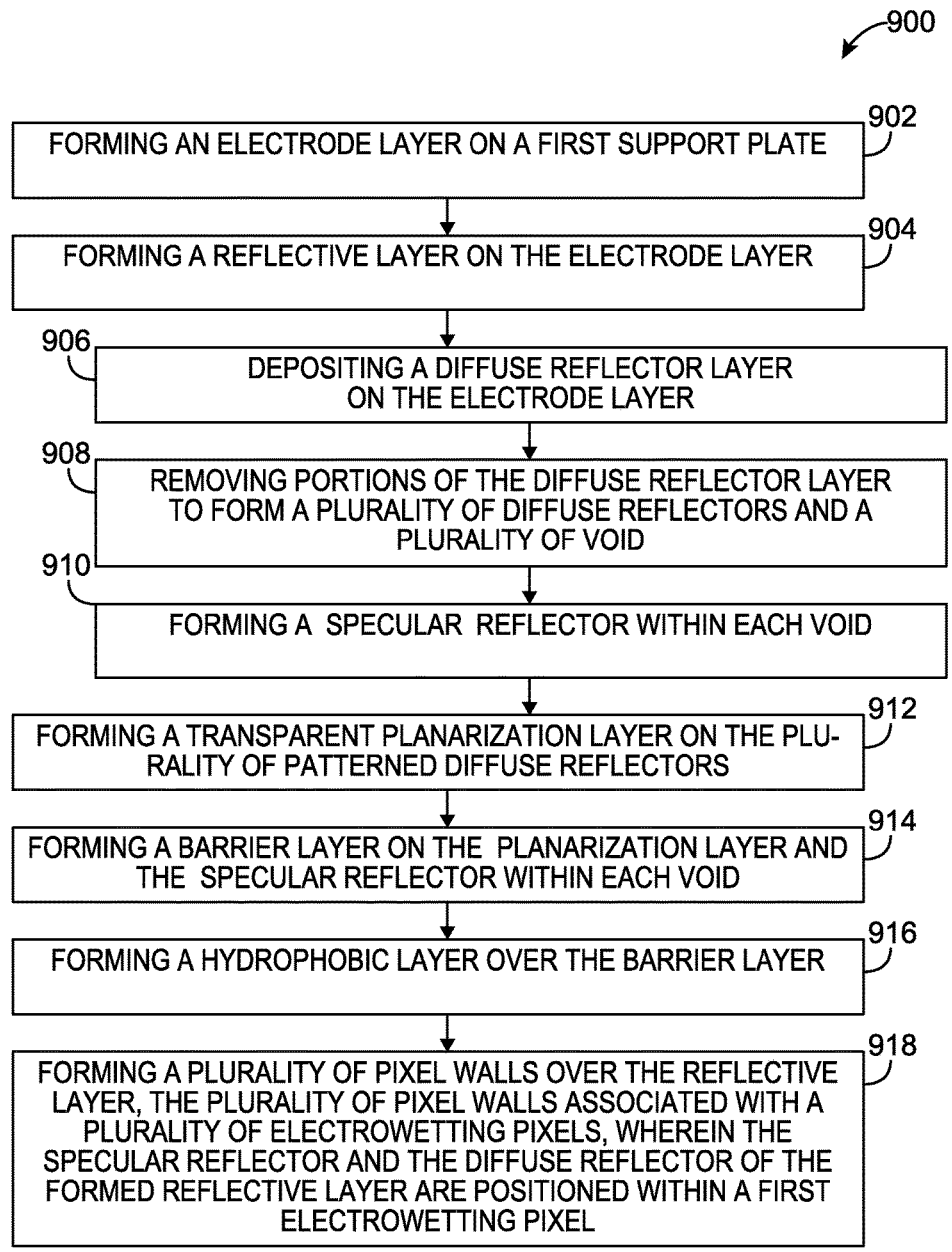
FIG. 9 illustrates an example method for fabricating the electrowetting display device of FIGS. 1-3.

FIG. 9 is a flow diagram of an example method 900 for fabricating an electrowetting display device, such as electrowetting display device 100 including reflective layer 110 as shown in FIGS. 1-3. Though claimed subject matter is not limited in this respect, process 900 may be performed manually (e.g., by humans) and/or using automatic equipment. At block 902, an electrode layer 108 is formed on first or bottom support plate 104. In this embodiment, electrode layer 108 is deposited on bottom support plate 104. Additional layers may be positioned between electrode layer 108 and bottom support plate 104. In one embodiment, a multilayer stack including a first conductive layer is formed on bottom support plate 104. In this embodiment, the first conductive layer is indium tin oxide (ITO), although in alternative embodiments the first conductive layer may be another suitable material. Deposition techniques include, for example, chemical vapor deposition (CVD), physical vapor deposition (PVD), molecular beam epitaxy (MBE), and sputtering. The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and a sputtering, for example.

Reflective layer 110 is then deposited 904 on electrode layer 108. In one embodiment, as shown in FIG. 9, depositing 904 reflective layer 110 on electrode layer 108 includes depositing 906 a diffuse reflector layer on electrode layer 108. A plurality of portions of the diffuse reflector layer are removed 908 to form a plurality of diffuse reflectors 114 and a plurality of voids. A specular reflector is then formed 910 within each void of the plurality of voids in the diffuse reflector layer to form a plurality of specular reflectors 112. As a result of this process, a diffuse reflector 114 will be deposited on a first portion of electrode layer 108 and a corresponding specular reflector 112 will be deposited on a second portion of electrode layer 108 different than the first portion. In this embodiment, specular reflector 112 and diffuse reflector 114 are positioned with respect to or within a respective portion of display surface area 106 of each electrowetting pixel 102. In a particular embodiment, a transparent planarization layer 138 is formed 912 on the plurality of diffuse reflectors 114 to enhance the electrowetting properties of electrowetting pixel 102. More specifically, planarization layer 138 may provide a desired smoothness to the surface to enhance oil movement without negatively affecting optical performance of electrowetting pixel 102. A suitable barrier layer 140 is formed 914 on the planarization layer and the specular reflectors not covered by planarization layer 138. This process forms reflective layer 110 as shown in FIGS. 1 and 2.

In an alternative embodiment not illustrated in FIG. 9, depositing 904 reflective layer 110 on electrode layer 108 includes forming a specular reflector layer on the electrode layer. Portions of the specular reflector layer are removed to form a plurality of specular reflectors and a plurality of voids. A diffuse reflector layer is then deposited within the removed portions of the specular reflector layer to form a plurality of diffuse reflectors. As a result, at least one diffuse reflector 114 of the plurality of diffuse reflectors and at least one corresponding specular reflector 112 of the plurality of specular reflectors are positioned with respect to a respective portion (i.e., second portion 116 and first portion 115, respectively) of display surface area 106 of each electrowetting pixel 102, to form reflective layer 110 as shown in FIGS. 1 and 2.

A hydrophobic layer, such as an AF 1600® layer, (e.g., hydrophobic layer 142, shown in FIGS. 1 and 2) is formed 916 over barrier layer 140. At block 918, a plurality of pixel walls 144 are formed to define a patterned electrowetting pixel grid 101 on hydrophobic layer 142. In one embodiment, pixel walls 144 include a photoresist material such as, for example, epoxy-based negative photoresist SU-8. The formed patterned electrowetting pixel grid 101 includes a plurality of rows and a plurality of columns that form an array of electrowetting pixels, such as shown in FIG. 3, including a plurality of electrowetting pixels 102 having a suitable width and length.

In one embodiment, a photoresist material is deposited over the multilayer stack and at block 918 the photoresist material is exposed to a diffractive dark field mask to form pixel walls 144. In alternative embodiments, these structures may be printed using suitable methods other than photolithography, including, without limitation, direct writing and electron beam lithography (EBL). The pixel walls 144 are cured and fused together and the uncured portions of the photoresist material are removed to leave pixel wall 144.

Following formation of the pixel walls, first fluid 150 and second fluid 152 (e.g., the oil and the electrolyte solution) can be disposed within electrowetting pixels 102 of electrowetting display device 100. A second support plate, such as top support plate 154, is coupled to electrowetting display device 100. As shown in FIGS. 1 and 2 for example, top support plate 154 is opposite bottom support plate 104, forming opposing outer surfaces of electrowetting display device 100.

Figure 10:
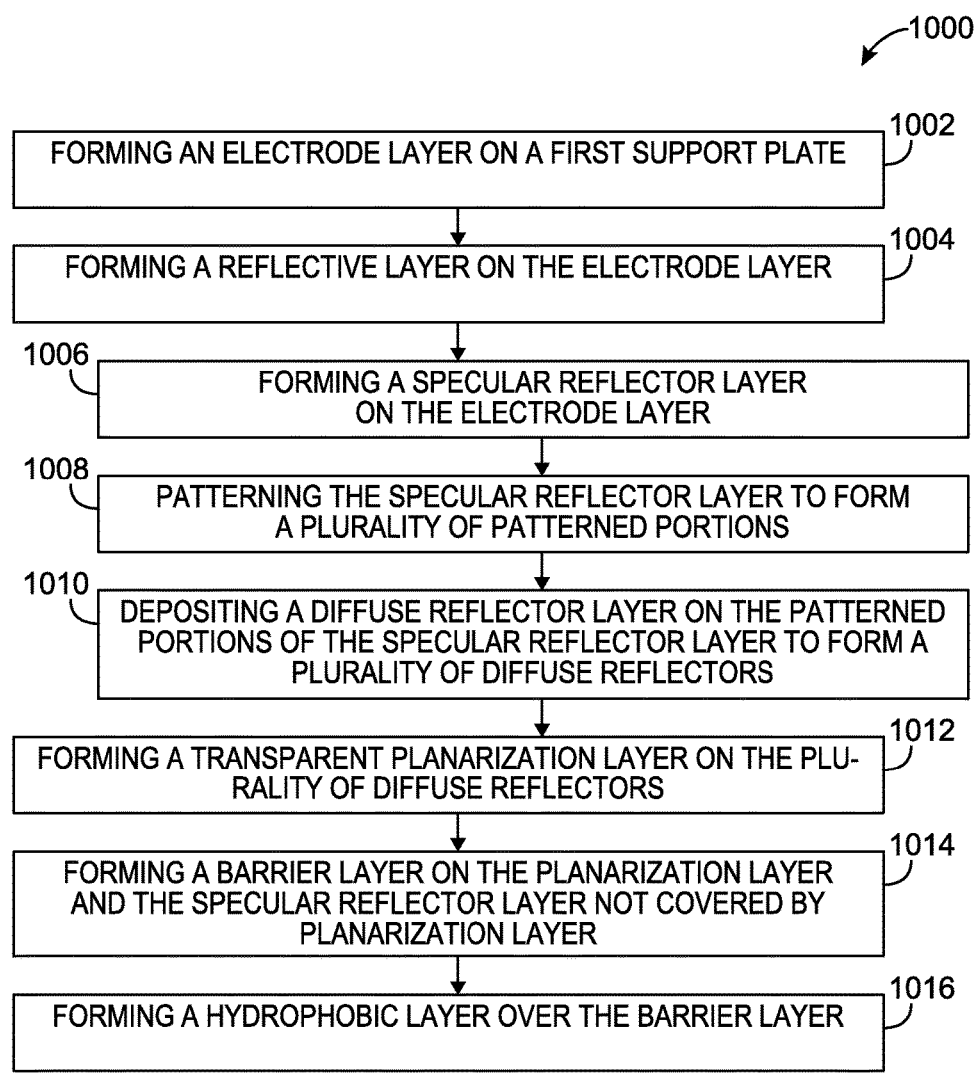
FIG. 10 illustrates an alternative example method for fabricating the electrowetting display device of FIGS. 4 and 5.

FIG. 10 is a flow diagram of an alternative example method 1000 for fabricating an electrowetting display device, such as electrowetting display device 100 including reflective layer 110 as shown in FIGS. 4 and 5. While specular reflector 112 and diffuse reflector 114 formed using method 900 includes, in certain embodiments, patterned deposition of the respective reflector layers to create separate reflector structures, method 1000 may provide a manufacturing simplification by patterning, e.g., etching, a specular reflector layer (which forms a plurality of specular reflectors) and forming a plurality of diffuse reflectors in respective patterned portions of the specular reflector layer. Though claimed subject matter is not limited in this respect, method 1000 may be performed manually (e.g., by humans) and/or using automatic equipment. At block 1002, an electrode layer 108 is formed on first or bottom support plate 104. In this embodiment, electrode layer 108 is deposited on bottom support plate 104. Additional layers may be positioned between electrode layer 108 and bottom support plate 104. In one embodiment, a multilayer stack including a first conductive layer is formed on bottom support plate 104. In this embodiment, the multilayer stack is formed on bottom support plate 104 as described above with reference to method 900 of FIG. 9.

Reflective layer 110 is then formed 1004 on electrode layer 108. Referring to FIG. 10, in this embodiment forming 1004 reflective layer 110 on electrode layer 108 includes forming 1006 a specular reflector layer on electrode layer 108. A plurality of portions of the specular reflector layer are patterned 1008 to form a plurality of patterned portions and a patterned diffuse reflector layer is deposited 1010 on the patterned portions of specular reflector layer to form a plurality of diffuse reflectors 114. In this embodiment, a specular reflector 112 and a corresponding diffuse reflector 114 are positioned with respect to or within a respective portion of display surface area 116 of each electrowetting pixel 102, such as electrowetting pixel 102a. In a particular embodiment, transparent planarization layer 138 is formed 1012 on the plurality of diffuse reflectors 114 and a suitable barrier layer 140 is formed 1014 on the planarization layer and the specular reflector layer not covered by planarization layer 138. This process forms diffuse reflector 114 as shown in FIGS. 4 and 5.

A hydrophobic layer (e.g., hydrophobic layer 142, illustrated in FIGS. 4 and 5) is formed 1016 over barrier layer 140. In this embodiment, method 1000 continues as described above with respect to method 1300 of FIG. 9 to form pixel walls 144 and build the remaining portions of electrowetting display device 100.

In one embodiment, a method for fabricating an electrowetting display device includes forming an electrode layer on a first support plate. A diffuse reflector layer is deposited on the electrode layer. Portions of the diffuse reflector layer are removed to form a plurality of diffuse reflectors and a plurality of voids. A specular reflector is formed within each void of the plurality of voids to form a reflective layer on the electrode layer. A plurality of pixel walls are formed over the reflective layer. The plurality of pixel walls are associated with a plurality of electrowetting pixels. In this embodiment, at least one specular reflector and at least one corresponding diffuse reflector of the plurality of diffuse reflectors are positioned within a first electrowetting pixel of the plurality of electrowetting pixels.

In an alternative embodiment, a method for fabricating an electrowetting display device includes forming an electrode layer on a first support plate. A specular reflector layer is formed on the electrode layer and portions of the specular reflector layer are removed to form a plurality of specular reflectors and a plurality of voids. A diffuse reflector is formed within each void of the plurality of voids to form a reflective layer on the electrode layer. At least one diffuse reflector and at least one corresponding specular reflector are positioned within a first electrowetting pixel of the plurality of electrowetting pixels.

In a further alternative embodiment, a method for fabricating an electrowetting display device includes forming an electrode layer on a first support plate. A specular reflector layer is formed on the electrode layer and portions. The specular reflector layer is patterned to form a plurality of patterned portions. A diffuse reflector layer is deposited on the patterned portions of the specular reflector layer to form a plurality of diffuse reflectors. At least one specular reflector of the plurality of patterned specular reflectors and at least one corresponding diffuse reflector of the plurality of diffuse reflectors are positioned with respect to a respective portion of each electrowetting pixel.

Figure 11:
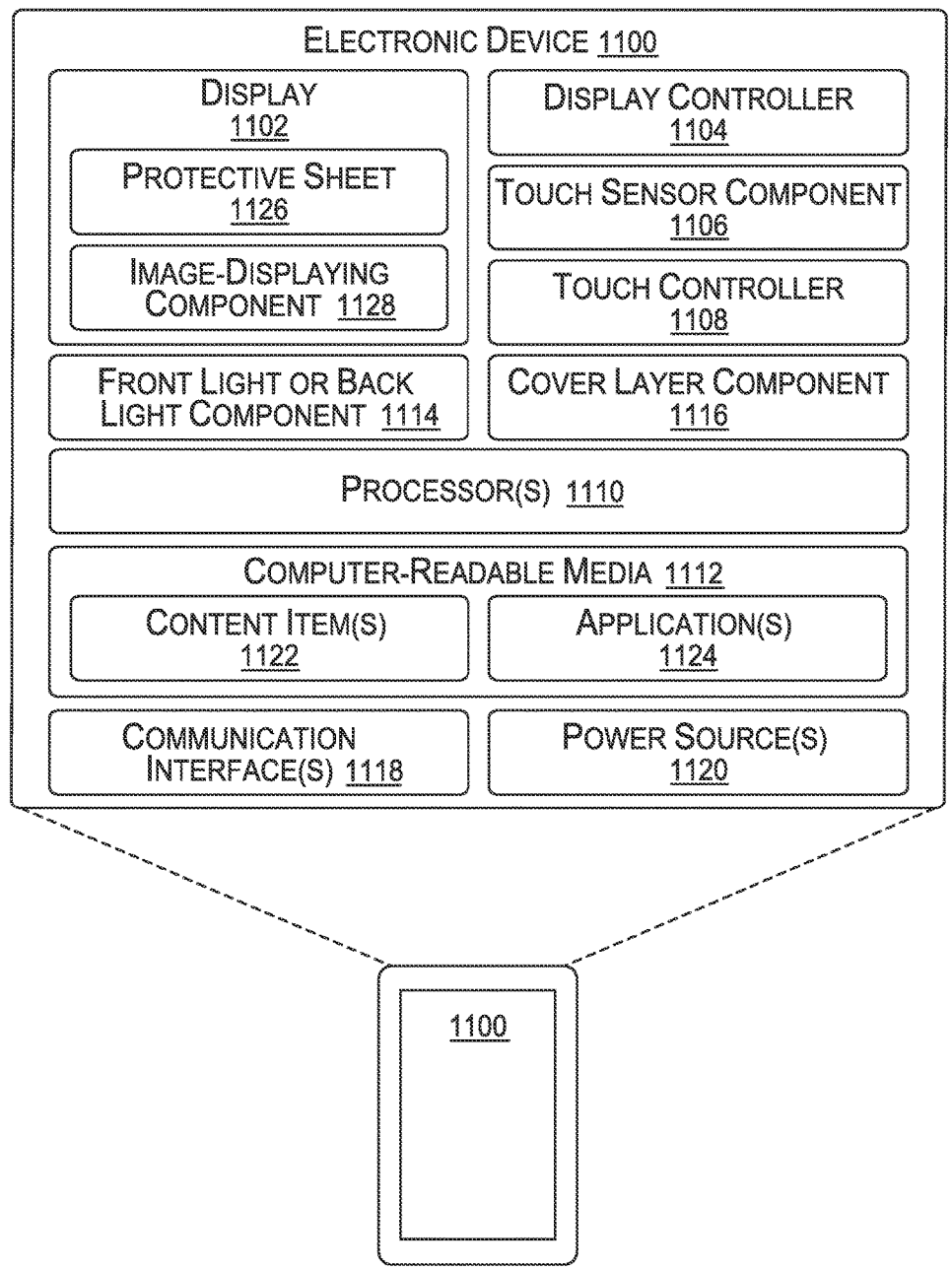
FIG. 11 illustrates an example electronic device that may incorporate an electrowetting display device, according to various embodiments.

FIG. 11 illustrates an example electronic device 1100 that may incorporate any of the display devices discussed above. Electronic device 1100 may comprise any type of electronic device having a display. For instance, electronic device 1100 may be a mobile electronic device (e.g., an electronic book reader, a tablet computing device, a laptop computer, a smart phone or other multifunction communication device, a portable digital assistant, a wearable computing device, or an automotive display). Alternatively, electronic device 1100 may be a non-mobile electronic device (e.g., a computer display or a television). In addition, while FIG. 11 illustrates several example components of electronic device 1100, it is to be appreciated that electronic device 1100 may also include other conventional components, such as an operating system, system busses, input/output components, and the like. Further, in other embodiments, such as in the case of a television or computer monitor, electronic device 1100 may only include a subset of the components illustrated.

Regardless of the specific implementation of electronic device 1100, electronic device 1100 includes a display 1102 and a corresponding display controller 1104. Display 1102 may represent a reflective or transmissive display in some instances or, alternatively, a transflective display (partially transmissive and partially reflective).

In one embodiment, display 1102 comprises an electrowetting display that employs an applied voltage to change the surface tension of a fluid in relation to a surface. For example, such an electrowetting display may include the array of pixels 102 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of display 1102 are independently activated, display 1102 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 1102 may represent a backlit display, examples of which are mentioned above.

In addition to including display 1102, FIG. 11 illustrates that some examples of electronic device 1100 may include a touch sensor component 1106 and a touch controller 1108. In some instances, at least one touch sensor component 1106 resides with, or is stacked on, display 1102 to form a touch-sensitive display. Thus, display 1102 may be capable of both accepting user touch input and rendering content in response to or corresponding to the touch input. As several examples, touch sensor component 1106 may comprise a capacitive touch sensor, a force sensitive resistance (FSR), an interpolating force sensitive resistance (IFSR) sensor, or any other type of touch sensor. In some instances, touch sensor component 1106 is capable of detecting touches as well as determining an amount of pressure or force of these touches.

FIG. 11 further illustrates that electronic device 1100 may include one or more processors 1110 and one or more computer-readable media 1112, as well as a front light component 1114 (which may alternatively be a backlight component in the case of a backlit display) for lighting display 1102, a cover layer component 1116, such as a cover glass or cover sheet, one or more communication interfaces 1118 and one or more power sources 1120. The communication interfaces 1118 may support both wired and wireless connection to various networks, such as cellular networks, radio, WiFi networks, short range networks (e.g., Bluetooth®), and infrared (IR) networks, for example.

Depending on the configuration of electronic device 1100, computer-readable media 1112 (and other computer-readable media described throughout) is an example of computer storage media and may include volatile and nonvolatile memory. Thus, computer-readable media 1112 may include, without limitation, RAM, ROM, EEPROM, flash memory, and/or other memory technology, and/or any other suitable medium that may be used to store computer-readable instructions, programs, applications, media items, and/or data which may be accessed by electronic device 1100.

Computer-readable media 1112 may be used to store any number of functional components that are executable on processor 1110, as well as content items 1122 and applications 1124. Thus, computer-readable media 1112 may include an operating system and a storage database to store one or more content items 1122, such as eBooks, audio books, songs, videos, still images, and the like. Computer-readable media 1112 of electronic device 1100 may also store one or more content presentation applications to render content items on electronic device 1100. These content presentation applications may be implemented as various applications 1124 depending upon content items 1122. For instance, the content presentation application may be an electronic book reader application for rending textual electronic books, an audio player for playing audio books or songs, or a video player for playing video.

In some instances, electronic device 1100 may couple to a cover (not illustrated in FIG. 11) to protect the display 1102 (and other components in the display stack or display assembly) of electronic device 1100. In one example, the cover may include a back flap that covers a back portion of electronic device 1100 and a front flap that covers display 1102 and the other components in the stack. Electronic device 1100 and/or the cover may include a sensor (e.g., a Hall effect sensor) to detect whether the cover is open (i.e., if the front flap is not atop display 1102 and other components). The sensor may send a signal to front light component 1114 if the cover is open and, in response, front light component 1114 may illuminate display 1102. If the cover is closed, meanwhile, front light component 1114 may receive a signal indicating that the cover has closed and, in response, front light component 1114 may turn off.

Furthermore, the amount of light emitted by front light component 1114 may vary. For instance, upon a user opening the cover, the light from the front light may gradually increase to its full illumination. In some instances, electronic device 1100 includes an ambient light sensor (not illustrated in FIG. 11) and the amount of illumination of front light component 1114 may be based at least in part on the amount of ambient light detected by the ambient light sensor. For example, front light component 1114 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1102 may vary depending on whether front light component 1114 is on or off, or based on the amount of light provided by front light component 1114. For instance, electronic device 1100 may implement a larger default font or a greater contrast when the light is off compared to when the light is on. In some embodiments, electronic device 1100 maintains, if the light is on, a contrast ratio for display 1102 that is within a certain defined percentage of the contrast ratio if the light is off.

As described above, touch sensor component 1106 may comprise a capacitive touch sensor that resides atop display 1102. In some examples, touch sensor component 1106 may be formed on or integrated with cover layer component 1116. In other examples, touch sensor component 1106 may be a separate component in the stack of the display assembly. Front light component 1114 may reside atop or below touch sensor component 1106. In some instances, either touch sensor component 1106 or front light component 1114 is coupled to a top surface of a protective sheet 1126 of display 1102. As one example, front light component 1114 may include a lightguide sheet and a light source (not illustrated in FIG. 11). The lightguide sheet may comprise a substrate (e.g., a transparent thermoplastic such as PMMA or other acrylic), a layer of lacquer and multiple grating elements formed in the layer of lacquer that function to propagate light from the light source towards display 1102; thus, illuminating display 1102.

Cover layer component 1116 may include a transparent substrate or sheet having an outer layer that functions to reduce at least one of glare or reflection of ambient light incident on electronic device 1100. In some instances, cover layer component 1116 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, protective sheet 1126 may include a similar UV-cured hard coating on the outer surface. Cover layer component 1116 may couple to another component or to protective sheet 1126 of display 1102. Cover layer component 1116 may, in some instances, also include a UV filter, a UV-absorbing dye, or the like, for protecting components lower in the stack from UV light incident on electronic device 1100. In still other examples, cover layer component 1116 may include a sheet of high-strength glass having an antiglare and/or antireflective coating.

Display 1102 includes protective sheet 1126 overlying an image-displaying component 1128. For example, display 1102 may be preassembled to have protective sheet 1126 as an outer surface on the upper or image-viewing side of display 1102. Accordingly, protective sheet 1126 may be integral with and may overlay image-displaying component 1128. Protective sheet 1126 may be optically transparent to enable a user to view, through protective sheet 1126, an image presented on image-displaying component 1128 of display 1102.

In some examples, protective sheet 1126 may be a transparent polymer film in the range of 25 to 200 micrometers in thickness. As several examples, protective sheet 1126 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1126 may include a coating, such as the hard coating described above. For instance, the hard coating may be applied to the outer surface of protective sheet 1126 before or after assembly of protective sheet 1126 with image-displaying component 1128 of display 1102. In some examples, the hard coating may include a photoinitiator or other reactive species in its composition, such as for curing the hard coating on protective sheet 1126. Furthermore, in some examples, protective sheet 1126 may be dyed with a UV-light-absorbing dye, or may be treated with other UV-absorbing treatment. For example, protective sheet 1126 may be treated to have a specified UV cutoff such that UV light below a cutoff or threshold wavelength is at least partially absorbed by protective sheet 1126, thereby protecting image-displaying component 1128 from UV light.

According to some embodiments herein, one or more of the components discussed above may be coupled to display 1102 using fluid optically-clear adhesive (LOCA). For example, the light guide portion of front light component 1114 may be coupled to display 1102 by placing LOCA on the outer or upper surface of protective sheet 1126. If the LOCA reaches the corner(s) and/or at least a portion of the perimeter of protective sheet 1126, UV-curing may be performed on the LOCA at the corners and/or the portion of the perimeter. Thereafter, the remaining LOCA may be UV-cured and front light component 1114 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1114. In other embodiments, the LOCA may be placed near a center of protective sheet 1126, and pressed outwards towards a perimeter of the top surface of protective sheet 1126 by placing front light component 1114 on top of the LOCA. The LOCA may then be cured by directing UV light through front light component 1114. As discussed above, and as discussed additionally below, various techniques, such as surface treatment of the protective sheet, may be used to prevent discoloration of the LOCA and/or protective sheet 1126.

While FIG. 11 illustrates a few example components, electronic device 1100 may have additional features or functionality. For example, electronic device 1100 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 1100 may reside remotely from electronic device 1100 in some implementations. In these implementations, electronic device 1100 may utilize communication interfaces 1118 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
a first support plate and a second support plate;
an electrowetting pixel region positioned between the first support plate and the second support plate;
a reflective layer positioned within the electrowetting pixel region, the reflective layer including a specular reflector positioned within at least a first portion of the reflective layer and a diffuse reflector positioned within a second portion of the reflective layer different from the first portion, wherein the specular reflector extends under at least a portion of the diffuse reflector;
an oil and an electrolyte solution that is immiscible with the oil, the oil and the electrolyte solution in the electrowetting pixel region; and
a pixel electrode associated with the electrowetting pixel region, the pixel electrode for applying a voltage within the electrowetting pixel region to cause relative displacement of the oil and the electrolyte solution to expose at least a portion of at least one of the specular reflector and the diffuse reflector.

2. The electrowetting display device of claim 1, wherein the pixel electrode is positioned within an electrode layer positioned between the reflective layer and the first support plate, and the reflective layer contacts the pixel electrode.

3. The electrowetting display device of claim 1, wherein the pixel electrode is positioned within a transparent electrode layer and the reflective layer is positioned between the transparent electrode layer and the first support plate.

4. The electrowetting display device of claim 1, wherein the electrowetting pixel region comprises an electrowetting pixel and the specular reflector is positioned within a first portion of the electrowetting pixel and the diffuse reflector is positioned within a second portion of the electrowetting pixel different from the first portion.

5. A display device, comprising:
a first support plate;
a pixel region formed on the first support plate, the pixel region comprising a pixel; and
a reflective layer positioned in the pixel, the reflective layer including a specular reflector within at least a first portion of the reflective layer and a diffuse reflector within a second portion of the reflective layer different from the first portion, wherein the specular reflector extends under at least a portion of the diffuse reflector.

6. The display device of claim 5, further comprising:
a second support plate coupled to the first support plate;
a first fluid and a second fluid that is immiscible with the first fluid, the first fluid and the second fluid arranged in the pixel region; and
a pixel electrode associated with the pixel region for applying a voltage within the pixel region to cause relative displacement of the first fluid and the second fluid and wherein with the pixel region in an on state, the first fluid forms a droplet within the pixel region to at least partially expose the reflective layer.

7. The display device of claim 6, wherein the reflective layer comprises an electrode.

8. The display device of claim 6, wherein the pixel electrode is positioned within an electrode layer, and the pixel electrode is in contact with the reflective layer.

9. The display device of claim 5, wherein the specular reflector comprises one of a metal, an alloy, a doped metal, or a dielectric reflector material and the diffuse reflector comprises titanium dioxide ($TiO_2$).

10. The display device of claim 5, further comprising a planarization layer disposed on at least a portion of the diffuse reflector.

11. The display device of claim 5, wherein the pixel includes a pixel wall and a boundary between the specular reflector and the diffuse reflector extends parallel with the pixel wall in a first direction across the pixel, the display device further comprising a pixel electrode associated with the pixel for applying a voltage within the pixel to cause displacement of the first fluid in a second direction perpendicular to the first direction to at least partially expose one of the specular reflector and the diffuse reflector.

12. The display device of claim 5, wherein the pixel includes a pixel wall and a boundary between the specular reflector and the diffuse reflector extends parallel with the pixel wall in a first direction across the pixel, the display device further comprising a pixel electrode associated with the pixel for applying a voltage within the pixel to cause displacement of the first fluid in the first direction to at least partially expose the specular reflector and the diffuse reflector substantially simultaneously.

13. The display device of claim 5, further comprising:
a first pixel electrode associated with a first portion of the pixel region for applying a voltage within the pixel region to cause displacement of the first fluid in a first direction; and
a second pixel electrode associated with a second portion of the pixel region for applying a voltage within the pixel region to cause displacement of the first fluid in a second direction different from the first direction.

14. The display device of claim 5, wherein the reflective layer has a diffusivity of at least 60%.

15. A method for fabricating an electrowetting display device, the method comprising:
forming an electrode layer on a first support plate;
forming a specular reflector layer on the electrode layer;
patterning the specular reflector layer to form a plurality of specular reflectors and a plurality of patterned portions;
depositing a diffuse reflector layer on the patterned portions to form a plurality of diffuse reflectors, wherein each diffuse reflector of the plurality of diffuse reflectors is formed on a respective patterned portion of the plurality of patterned portions; and
forming a plurality of pixel walls over the reflective layer, the plurality of pixel walls associated with a plurality of electrowetting pixels, wherein at least one specular reflector of the plurality of specular reflectors and at least one corresponding diffuse reflector of the plurality of diffuse reflectors are positioned within a first electrowetting pixel of the plurality of electrowetting pixels.

16. The method of claim 15, further comprising forming a planarization layer on the plurality of diffuse reflectors.

17. The method of claim 16, further comprising forming a barrier layer on the planarization layer and the specular reflector within each void.

18. The method of claim 15, further comprising:
depositing a barrier layer over the reflective layer;
depositing a hydrophobic layer over the barrier layer; and
forming the plurality of pixel walls on the hydrophobic layer to define a patterned electrowetting pixel grid defining the plurality of electrowetting pixels.

* * * * *